United States Patent
Chubb et al.

(10) Patent No.: US 6,746,149 B1
(45) Date of Patent: Jun. 8, 2004

(54) RARE EARTH OPTICAL TEMPERATURE SENSOR

(75) Inventors: Donald L. Chubb, Olmsted Falls, OH (US); Phillip Jenkins, Cleveland Heights, OH (US)

(73) Assignee: The United States of America as represented by the Admistrator of NASA, Washington, DC (US)

( * ) Notice: Subject to any disclaimer, the term of this patent is extended or adjusted under 35 U.S.C. 154(b) by 390 days.

(21) Appl. No.: 09/323,650

(22) Filed: Jun. 1, 1999

(51) Int. Cl.[7] .................. G01K 11/00; G01J 5/00
(52) U.S. Cl. ................. 374/161; 374/131
(58) Field of Search ............... 374/131, 161, 374/120; 250/458.1, 338.1, 341.6, 361 R; 356/43, 44

(56) References Cited

U.S. PATENT DOCUMENTS

| | | | | |
|---|---|---|---|---|
| 4,313,344 A | * | 2/1982 | Brogardh et al. | 374/131 |
| 4,448,547 A | * | 5/1984 | Wickersheim | 374/131 |
| 4,523,315 A | * | 6/1985 | Stone | 359/334 |
| 4,576,486 A | * | 3/1986 | Dils | 250/339.04 |
| 4,584,426 A | | 4/1986 | Nelson | |
| 4,625,389 A | * | 12/1986 | Readhead | 257/440 |
| 4,764,104 A | * | 8/1988 | Nelson | 252/492 |
| 4,794,619 A | * | 12/1988 | Tregay | 374/130 |
| 4,826,426 A | * | 5/1989 | Nelson | 431/100 |
| 5,035,513 A | * | 7/1991 | Fehrenbach et al. | 374/161 |
| 5,080,724 A | * | 1/1992 | Chubb | 136/253 |
| 5,290,103 A | * | 3/1994 | Fevrier et al. | 374/131 |
| 5,299,869 A | * | 4/1994 | Wissinger | 374/137 |
| 5,352,040 A | * | 10/1994 | Mihalczo et al. | 374/131 |
| 5,447,786 A | * | 9/1995 | Rose et al. | 442/172 |
| 5,579,427 A | * | 11/1996 | Rusanov et al. | 385/124 |
| 5,601,661 A | * | 2/1997 | Milstein et al. | 136/253 |
| 5,780,370 A | * | 7/1998 | Chen et al. | 442/414 |
| 5,846,684 A | * | 12/1998 | Paz-Pujalt et al. | 430/139 |
| 5,879,473 A | * | 3/1999 | Sarraf | 136/253 |
| 5,885,484 A | * | 3/1999 | Allison et al. | 252/301.4 P |
| 6,013,199 A | * | 1/2000 | McFarland et al. | 252/301.4 R |
| 6,045,259 A | * | 4/2000 | Djeu | 374/161 |

* cited by examiner

*Primary Examiner*—Diego Gutierrez
*Assistant Examiner*—Mirellys Jagan
(74) *Attorney, Agent, or Firm*—Kent N. Stone

(57) ABSTRACT

A rare earth optical temperature sensor is disclosed for measuring high temperatures. Optical temperature sensors exist that channel emissions from a sensor to a detector using a light pipe. The invention uses a rare earth emitter to transform the sensed thermal energy into a narrow band width optical signal that travels to a detector using a light pipe. An optical bandpass filter at the detector removes any noise signal outside of the band width of the signal from the emitter.

8 Claims, 1 Drawing Sheet

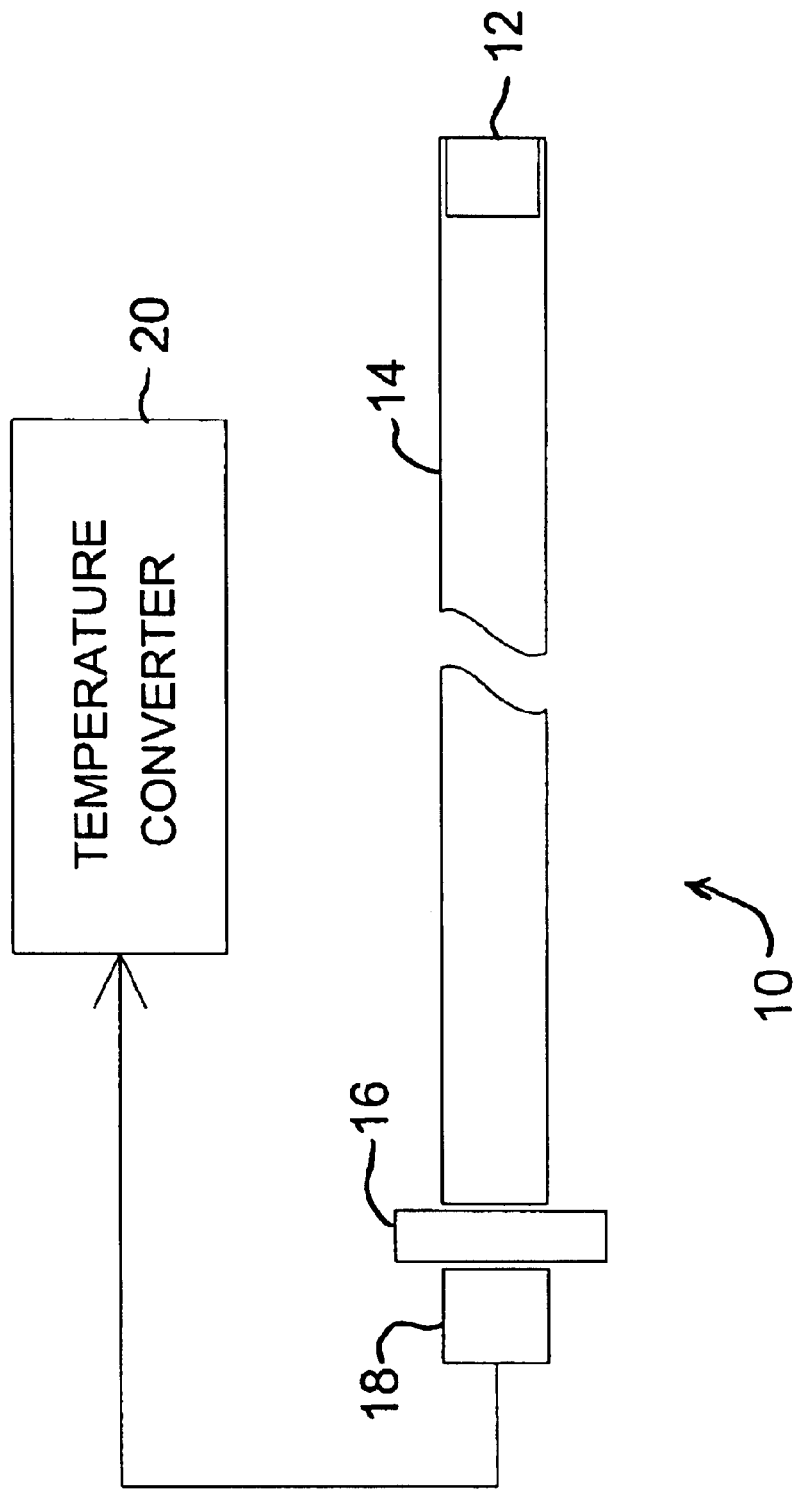

RARE EARTH OPTICAL TEMPERATURE SENSOR

The invention described herein was made by employees of the United States Government and may be manufactured and used by or for the Government for Government purposes without the payment of any royalties thereon or therefor.

BACKGROUND OF THE INVENTION

The present invention relates to temperature sensors and in particular to high temperature optical temperature sensors.

Selective emitters are devices for converting thermal energy into narrow band radiation or energy. Most solid state materials have nearly a constant spectral emittance (gray body). The spectral emittance of a rare earth is characterized by several emission bands in the visible and near infrared region resulting from electronic transitions from the lowest excited states. Materials containing rare earths (e.g., ytterbium (Yb), erbium (Er), thulium (Tm), dysprosium ($D_Y$), and holmium (Ho)) can emit in narrow wavelength bands in the visible and near infrared region of the spectrum.

Selective emitters have been used in thermophotovoltaic energy conversion systems such as those described in U.S. Pat. Nos. 4,584,426 and 5,080,724.

Many existing temperature sensors are unsuitable and/or uneconomical for use in high temperature (greater than 2,000° K) harsh environments. For example, metal thermocouples suffer from high thermal conductivity (e.g., 1 W/cmK) that conducts heat away from the measurement site, causing errors in the measurement. Other sensors may require sophisticated electronics or other techniques to eliminate errors from the measurements.

SUMMARY OF THE INVENTION

An optical temperature sensor includes an emitter having a selective energy emission band. The emitter emits energy within the emission band in response to the emitter temperature. The sensor also includes a light pipe having a first and a second end. The first end communicates with the emitter. Also included is an optical bandpass filter communicating with the second end. The filter has a pass band corresponding to the emission band. Also included is a detector communicating with the filter. The detector detects the emitted energy as a measure of the temperature.

BRIEF DESCRIPTION OF THE DRAWING

The drawing is a schematic diagram of a sensor according to the invention.

DESCRIPTION OF THE PREFERRED EMBODIMENTS

Referring to the drawing, an optical temperature sensor 10 includes a selective emitter 12, a light pipe 14, an optical bandpass filter 16 and a detector 18. The emitter 12 may be, for example, a section of a circular cylinder friction fit into a cavity in the end of the light pipe 14 and have an approximate longitudinal thickness of 0.1 mm and a diameter in the approximate range of 0.1 to 1 mm. The selective emitter may also be deposited on the end of the light pump by a conventional film deposition technique such as evaporation, sputtering, or plasma spraying.

The emitter 12 may be composed, for example, of a rare earth oxide, a rare earth alumunum garnet, or a rare earth doped host material. The emitter 12 has a selective energy emission band, i.e., the emitter emits energy within the emission band in response to the temperature of the emitter 12. The host material of the emitter 12 may be, for example, yttrium aluminum garnet (YAG, $Y_3Al_5O_{12}$) or yttrium oxide ($Y_2O_3$). Different rare earth dopants provide different selective emission bands. For example, Yb provides a band about $\lambda=1$ μm, Er: $\lambda=1.5$ μm, Tm: $\lambda=1.7$ μm, Ho: $\lambda=2.0$ μm, and $D_Y$: $\lambda=2.7$ μm.

The radiation emitted by the emitter 12 is coupled into the light pipe 14. The light pipe 14 may be, for example, a circular cylindrical optical fiber having an approximate diameter in the range of 0.1 to 1.0 mm. The light pipe 14 acts as a waveguide for the radiation emitted by the emitter 12. The light pipe 14 may be composed, for example, of sapphire, yttrium oxide or quartz. The filter 16 is a conventional optical bandpass filter. The filter 16 passes radiation in the emission band of the emitter 12. Radiation in the light pipe 14 within the emission band of the emitter 12 is passed by the filter 16 to the detector 18. Typically, the detector 18 will be an optical sensor sensitive to a relatively broad band of radiation (e.g., near infrared, infrared) which will include the emission band of the emitter 12. The detector 18 may be, for example, composed of silicon, lead sulfide (PbS) or indium antimonide (InSb).

The temperature converter 20 receives a signal from the detector 18 indicative of the radiation emitted by the emitter 12 and converts this signal to a more useable form, e.g., a displayed temperature, a digitized temperature, a temperature control signal or an alarm.

The radiation in the emittance bands of the rare earths is strongly dependent on the temperature (e.g., greater than $T^4$). The radiation emitted by a rare earth in an emission band is as follows:

$$q_x = \frac{15}{\pi^4} \varepsilon_b \sigma_{sb} T^4 \int_{u_l}^{u_n} \frac{u^3}{e^u - 1} du$$

where $u_n = \dfrac{hc_0}{\lambda_u kT}$ and $u_l = \dfrac{hc_0}{\lambda_l kT}$ $\sigma_{sb}$ = Stefan-Boltzmann constant $\lambda_u$ = short wavelength end of selective emitter emission band $\lambda_l$ = long wavelength end of selective emitter emission band $h$ = Planck constant $c_0$ = speed of light in a vacuum $k$ = Boltzmann constant $T$ = temperature in degrees Kelvin $\varepsilon_b$ = emittance of emission band of selective emitter If the radiation then travels through the light pipe 14 and the filter 16 (which passes wavelengths between $\lambda_l$ and $\lambda_u$), the radiation at the detector 18 will be:

$q_d = T_f T_s q_E$ $T_f$ = transmission of filter $T_s$ = transmission of light pipe The radiation $q_E$ leaving the emitter 12 is a sensitive function of the temperature T of the emitter 12. Therefore, excellent temperature resolution is possible with the sensor 10. In addition, the host materials YAG and yttrium oxide, or a rare earth oxide, or a rare earth aluminum garnet, can be used in high temperature (greater than 2,000° K) environments, thus providing a sensitive temperature sensor that can operate in high temperatures and harsh environments.

The most expensive component in the sensor 10 is the detector 18. As a result, the lowest cost sensor 10 will use a detector of silicon. In this case, a Yb selective emitter may be chosen because such an emitter has an emission band centered at about $\lambda=1$ $\mu$m and silicon responds only for $\lambda$ less than 1.1 $\mu$m (near infrared). The emitter 12 may then be, for example, ytterbium doped YAG or yttrium oxide.

Using a light pipe 14 of sapphire, the sensor 10 has, for example, a conductivity of about 0.01 W/cmK. This is much lower than that of a metal thermocouple (e.g., 1 W/cmK) and produces much less error in the measurement due to conduction of heat away from the measurement site.

Ytterbium, which has the shortest wave length emission band of the rare earths, requires the highest temperature to produce significant radiation. Therefore, if lower temperature operation is required, other rare earths with longer wavelength emission bands may be required. In this case, another detector instead of silicon would likely be chosen.

In operation, the emitter 12 is placed in contact with a sample whose temperature is desired. The emitter 12 assumes the temperature of the sample and emits a corresponding amount of radiation within the selective emission band of emitter 12. The radiation travels along the light pipe 14 and through the filter 16 and is detected by the detector 18. The detector 18 provides a signal that corresponds to the temperature of the sample. This signal is converted by the temperature converter 20 into an actual temperature. This conversion can be, for example, a look-up table or a model of the physical relationships.

Temperature error with the sensor 10 will result from stray radiation within the wavelength range transmitted by the filter 16. This error will be small since, for example, sapphire is transparent out to a wavelength of almost 5 $\mu$m. Therefore, most of the radiation with a wavelength less than 5 $\mu$m that strikes the sapphire will pass through the fiber and will not reach the detector. Also, the radiation from the emitter 12 will be much larger than any stray radiation within the selective energy emission band. The selective emitter/filter combination has the effect of substantially improving the signal to noise ratio in the sensor.

The upper temperature limit for the sensor is determined by the melting point of the emitter material and the light pipe material. For YAG, the melting point is 2,200° K; and for the rare earth oxides the melting points are greater than 2200° K. Sapphire has a melting point of 2,345° K. If a higher operating temperature is desired, then yttrium oxide with a melting point of 2,683° K can be used for both the light pipe and emitter host material.

The lower temperature limit for the sensor is determined by the minimum power that the detector 18 can measure. If Yb is the rare earth used in the sensor, then $\lambda_u$ is approximately 0.9 $\mu$m and $\lambda_l$ is approximately 1.1 $\mu$m. Assuming $\epsilon_b$ is 0.5 and $T_f/T_s$ is 0.1, then T greater than 625° K will yield $q_d$ greater than $1\times10^{-7}$ W/cm$^2$. A silicon detector at room temperature of 0.01 cm$^2$ area will respond to this value of $q_d$. Therefore, if Yb is used as the rare earth in the selective emitter then a temperature as low as 625° K is detectable.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An optical temperature sensor, said sensor comprising:
   an emitter having a selective energy emission band, said emitter converting thermal energy to energy within said emission band in response to a temperature of said emitter, and wherein said emitter contains a rare earth element;
   a light pipe having a first end and a second end, said first end communicating with said emitter;
   an optical bandpass filter communicating with said second end, said filter having a pass band within said emission band; and
   a detector communicating with said filter, said detector detecting said emitted energy as a measure of said temperature.

2. An optical temperature sensor, said sensor comprising:
   an emitter having a selective energy emission band, said emitter converting thermal energy to energy within said emission band in response to a temperature of said emitter, and wherein said emitter is composed of a rare earth aluminum garnet;
   a light pipe having a first end and a second end, said first end communicating with said emitter;
   an optical bandpass filter communicating with said second end, said filter having a pass band within said emission band; and
   a detector communicating with said filter, said detector detecting said emitted energy as a measure of said temperature.

3. An optical temperature sensor, said sensor comprising:
   an emitter having a selective energy emission band, said emitter converting thermal energy to energy within said emission band in response to a temperature of said emitter, and wherein said emitter is composed of a rare earth oxide;
   a light pipe having a first end and a second end, said first end communicating with said emitter;
   an optical bandpass filter communicating with said second end, said filter having a pass band within said emission band; and
   a detector communicating with said filter, said detector detecting said emitted energy as a measure of said temperature.

4. An optical temperature sensor according to claim 3, wherein said rare earth oxide is ytterbium oxide.

5. An optical temperature sensor, said sensor comprising:
   an emitter having a selective energy emission band, said emitter converting thermal energy to energy within said emission band in response to a temperature of said emitter, and wherein said emitter is a high temperature host material which is doped with a rare earth element;
   a light pipe having a first end and a second end, said first end communicating with said emitter;
   an optical bandpass filter communicating with said second end, said filter having a pass band within said emission band; and
   a detector communicating with said filter, said detector detecting said emitted energy as a measure of said temperature.

6. An optical temperature sensor according to claim 5, wherein said emitter is composed of yttrium oxide doped with ytterbium.

7. An optical temperature sensor according to claim 5, wherein said host material is yttrium aluminum garnet which is doped with a rare earth element.

8. An optical temperature sensor according to claim 7, wherein said dopant is ytterbium.

* * * * *